United States Patent [19]
Austin et al.

[11] Patent Number: 6,081,379
[45] Date of Patent: Jun. 27, 2000

[54] MULTIPLE COUPLED GIRES-TOURNOIS INTERFEROMETERS FOR GROUP-DELAY-DISPERSION CONTROL

[75] Inventors: R. Russel Austin, Novato; Boris Golubovic, Sunnyvale, both of Calif.

[73] Assignee: Coherent, Inc., Santa Clara, Calif.

[21] Appl. No.: 09/181,798

[22] Filed: Oct. 28, 1998

[51] Int. Cl.$^7$ .................. G02B 1/10; G02B 5/28
[52] U.S. Cl. .......... 359/584; 359/580; 359/590
[58] Field of Search .................. 359/580, 584, 359/590; 372/99, 25

[56] References Cited

U.S. PATENT DOCUMENTS

| | | | |
|---|---|---|---|
| 5,293,393 | 3/1994 | Kosaka | 372/99 |
| 5,734,503 | 3/1998 | Szipócs et al. | 359/584 |

FOREIGN PATENT DOCUMENTS

| | | | |
|---|---|---|---|
| 0 041 358 | 5/1981 | European Pat. Off. | G02B 5/28 |
| 2-23302 | 7/1988 | Japan | G02B 5/08 |

OTHER PUBLICATIONS

W. Zhao & E. Bourkoff, "Compression of nonlinearly chirped pulses using Gires–Tournois interferometers," *Appl. Phys. Lett.*, vol. 50, No. 19, May 11, 1987, pp. 1304–1306.

J.M. Jacobson, K. Naganuma, H.A. Haus & J.G. Fujimoto, "Femtosecond pulse generation in a Ti:Al$_2$O$_3$ laser by using second–and third–order intracavity dispersion," *Optic Letters*, vol. 17, No. 22, Nov. 15. 1992, pp. 1608–1610.

J. Kuhl & J. Heppner, "Compression of Femtosecond Optical Pulses with Dielectric Multilayer Interferometers," *IEEE Transactions on Quantum Electronics*, vol. QE–22, No. 1, Jan. 1986, pp. 182–185.

Paolo Laporta, et al., "Dispersive effects in the reflection of femtosecond optical pulses from broadband dielectric mirrors," *Applied Optics*, vol. 24, No. 13, Jul. 1, 1985, pp. 2014–2020.

Nicolai Matuschek, et al., "Theory of Double–Chirped Mirrors," *IEEE Journal of Selected Topics in Quantum Electronics*, vol. 4, No. 2, Mar./Apr. 1998, pp. 197–208.

R. Szipócs, "Theory and design of dispersive dielectric high reflectors for femtosecond pulse laser systems," *Proceedings the OSA Conference on Optical Interference Coatings*, Jun. 7–12, 1998, Tucson, AZ, pp. 290–292.

A.V. Tikhonravov, et al., "To the design and theory of chirped mirrors," *Proceedings the OSA Conference on Optical Interference Coatings*, Jun. 7–12, 1998, Tucson, AZ, pp. 293–295.

N. Matuschek, et al., "Design of broadband double–chirped mirrors for the generation of sub–10 fs laser pulses," *Proceedings the OSA Conference on Optical Interference Coatings*, Jun. 7–12, 1998, Tucson, AZ, pp. 296–298.

*Primary Examiner*—Cassandra Spyrou
*Assistant Examiner*—Jennifer Winstedt
*Attorney, Agent, or Firm*—Limbach & Limbach L.L.P.

[57] ABSTRACT

Negative group-delay-dispersion mirror (NGDD-mirror) multilayered structures are formed by two interferentially coupled Gires-Tournois interferometer cavities on a common, highly-reflective mirror in a single monolithic multilayered structure.

13 Claims, 13 Drawing Sheets

MULTIPLE COUPLED GIRES-TOURNOIS INTERFEROMETERS FOR GROUP-DELAY-DISPERSION CONTROL

TECHNICAL FIELD OF THE INVENTION

The present invention relates generally to mutlilayer mirrors having controlled phase-dispersion for use in so-called ultrafast lasers which deliver ultrashort pulses, for example less than about 100 femtoseconds (fs). It relates in particular to a monolithic interferentially-coupled multiple Gires-Tournois interferometer structure providing negative-group-delay dispersion by selective resonant trapping.

DISCUSSION OF BACKGROUND ART

In order to support the ultrashort pulse length characteristic of an ultrafast laser, the laser must possess a total negative group-delay-dispersion, (negative GDD or NGDD) i.e., the sum of the GDD of the laser gain-medium and all cavity components must be negative. In a simple arrangement of a laser cavity and dielectric material therein, such as, a gain medium and a mode locking device, total cavity GDD, for wavelengths less than 1000 nanometers (nm) is usually positive, i.e., shorter wavelength light experiences a higher refractive index and lower group velocity, and lags behind longer wavelength light. This causes lengthening of a laser pulse each round trip and prevents stable, short-pulse operation.

One means of avoiding this is to include one or more NGDD devices having collective negative GDD at least equal to, and preferably greater than, this positive GDD. In many applications, the negative GDD is preferably substantially constant over a wavelength range at least equal to the laser output spectrum, and, if the laser is to be tunable over a range of wavelengths, the NGDD is preferably substantially constant over a range in excess of the tuning range.

Reflective NGDD devices which have been used with prior-art ultrafast lasers include Gires-Tournois Interferometer (GTI) mirrors. A GTI-mirror is a multilayer NGDD-mirror including a reflector, which comprises a stack of alternating high and low refractive index dielectric layers, each layer generally having an optical thickness of one-quarter wavelength (0.25 λ or one QWOT) at about the nominal operating wavelength of the laser, and a single, Fabry-Perot-like "spacer" layer (typically a few half-wavelengths thick) of a dielectric material deposited on the reflector. A partially-reflecting multilayer stack may (optionally) be deposited on the spacer layer. A prior art GTI-mirror typically gives a relatively constant negative GDD over only a relatively narrow wavelength range, for example, about 50.0 nm. In a GTI-mirror, the NGDD is achieved by selective resonant trapping of certain wavelengths in the spacer layer. Such a device is described extensively in a paper "Compression of Femto Second Optical Pulses with Dielectric Multilayer Interferometers", Kuhl et al., IEEE Transactions in Quantum Electronics, QE-22, 1, pp. 182–185, (January 1986).

In U.S. Pat. No. 5,734,503 (Szipocs et al.) multilayer NGDD mirrors described as "chirped mirrors" are disclosed. One disclosed example of such a mirror includes a substrate having a structure of more than 40 layers deposited thereon. In this structure, essentially no two adjacent layers have the same optical thickness. Two materials are used for adjacent layers, one having a relatively high refractive index and the other a relatively low refractive index. Throughout the structure, the optical thickness between adjacent layers is substantial, with optical thickness ratios up to about 2:1 not being uncommon. The thickness of individual layers is computer generated (optimized) from an initial layer system described as "intuitive". Increasing individual layers in thickness from the front to the back of the layer system, i.e., from the outermost layer towards the substrate, or a Fourier transform design is suggested, although no detail of such an initial layer system is disclosed. Optimization is performed simultaneously to a GDD specification and a reflectivity specification.

It is taught that, following optimization, apart from a trend of increasing optical thickness of a "reflective period" from the front to the back of the layer system, the layer system does not have any orderly structure. It is taught that nearly-constant NGDD is achieved without the use of Fabry-Perot or GTI resonant trapping mechanisms in the structure, and results simply from different penetration depths of different wavelengths into the structure. Such a mirror appears to be able to provide constant NGDD over a broader band of wavelengths than a GTI-mirror, for example, up to about 150 nm, at a nominal center wavelength of about 800 nm, for a GDD of $-45$ $fs^2$.

Other workers have attempted to provide similar results to the above discussed Szipocs et al. result via a more rational approach to the so-called "chirping" of the mirror structures. Tikhonravov et al. in a paper "To the design and theory of chirped mirrors", Proceedings the OSA Conference on Optical Interference Coatings, Jun. 7–12, 1998, Tucson Ariz., pp 293–5, ISBN 1-55752-549-8, attempts to improve on the design method of Szipocs et al. by considering that the design resolves itself into a mirror portion and a phase-correcting portion. In an example of optimized final structure, however, more than half of the 44 layers of an exemplified design have no identifiable relationship with each other, i.e., are aperiodic, and it is very difficult to determine where a mirror portion ends and a phase-correcting portion begins. In the GDD as a function of wavelength there are peak-to-valley oscillations of up to 10 femtoseconds in a nominal range between about $-40$ and $-50$ $fs^2$. These are described as being inevitable.

In another paper "Design of broadband double-chirped mirrors for generation of sub-10 fs laser pulses", Matuschek et al., Ibid. pp. 296–8, it is disclosed that design is initiated by a structure comprising elements described as a quarter-wave section; a simple-chirp section; a double-chirp section; and an AR-coating section. It is disclosed that, after optimization, the different sections tend to "melt together". A final optimized structure is not shown.

In most ultrafast lasers a compensating NGDD far much greater than the $-40$ to $-60$ $fs^2$ of above described prior art devices is required. This is typically remedied by using multiple such devices or resonator structures which will provide multiple reflections from one or more devices. If this is to be achieved using such devices "intra-cavity", then attention must be paid to limiting reflection losses in the resonator (laser resonant-cavity). In this case, also, oscillations in GDD described in the Tikhonravov et al. paper are of concern, as they are compounded by the multiple reflections.

In most ultrafast lasers, a cavity loss in excess of 1.0% would lead to significant loss of output power. By way of example, in an ultrafast laser having 10% outcoupling, a 1% cavity loss (per round-trip) equates to about 10% loss of output power. Because of this, even if 99.9% reflecting NGDD-mirrors were used, more than about ten intra-cavity reflections therefrom per round-trip would produce significant output-power reduction.

While the above described "chirped" NGDD-mirror appears to achieve desirable NGDD properties over a bandwidth greater than has been achieved in prior-art devices of the GTI type which rely on a wide (thick) resonant-cavity to provide NGDD, it would appear from consideration of optical multilayer theory that the aperiodic structures used to achieve these NGDD properties mirror structure are far from those which would produce the highest possible reflectivity over the broadest bandwidth with the same number of layers of the same materials.

It is well-known to designers of multilayer optical devices that the highest reflectivity that can be obtained, at a particular wavelength, with a group of layers having alternately high and low refractive index is achieved when all layers in the group have the essentially the same optical thickness (an optical thickness ratio of 1:1) of one-quarter wavelength at the particular wavelength. Essentially the same optical thickness, here meaning to the extent that is achievable over a broad wavelength range considering refractive index dispersion in the materials and normal manufacturing tolerances. Departures from the 1:1 ratio will result in a lower reflectivity over a narrower bandwidth.

It would be advantageous to provide multilayer structures which achieved comparable NGDD performance to the Szipocs et al. and other above described "chirped-mirror" structures, while preserving sufficient order in the structures that the magnitude and bandwidth of reflectivity were not unduly compromised by any structural mechanisms or features necessary to provide that NGDD. The present invention provides such structures and methods for designing them.

SUMMARY OF THE INVENTION

In arriving at NGDD mirror structures in accordance with the present invention the inventors have chosen not to continue to follow a quest of avoiding or eliminating Fabry-Perot resonances through the use of highly complex "chirped-mirror" structures, but to address the limited-bandwidth shortcomings of the prior-art GTI-mirror, and remedy these shortcomings through an understanding and advantageous exploitation of the resonant trapping mechanism of such a device.

The inventive structure may be termed, in general, a coherently-coupled multiple Gires-Tournois interferometer. In one aspect the inventive structure may be defined as a single monolithic multilayer structure formed from two spaced-apart, interferentially-coupled Gires-Tournois interferometer cavities surmounting a highly reflective quarter-wave multilayer reflector having a characteristic reflection bandwidth, the monolithic multilayer structure having a selected negative group-delay dispersion over a range of wavelengths within the characteristic reflection bandwidth of the quarter-wave multilayer reflector.

In another aspect, the inventive structure may be defined as a quarter-wavelength multilayer reflector surmounted by two (or more) resonant cavity layers each having an optical thickness of one-half wavelength or greater, and being spaced apart by one or more layers having a thickness selected cooperative with a selection of the thickness of the resonant cavity layers thickness such that the resonant cavity layers optically interact to provide a desired NGDD over a bandwidth or wavelength range lying within the bandwidth of the quarter-wave stack. Optionally, there may be one or more layers having an optical thickness less than one half-wavelength on the outermost of the cavity layers.

In the definition of the present invention provided above, the quarter wave stack is a well-known quarter-wave stack of two different transparent dielectric materials wherein each of the layers is about one QWOT at some so-called center-wavelength. The stack has a characteristic reflection bandwidth determined by the refractive indices of the layers. Those skilled in the art will recognize that this can be mathematically defined but can be approximated by a range over which the stack has a reflection greater than or equal to some arbitrarily-selected high reflectivity value, for example 99%, 99.9% or 99.99%. As a quarter-wave stack provides a frequency-symmetrical spectral-response, the so-called center-wavelength is actually not centrally located in the characteristic reflection band in wavelength terms, but is that wavelength which represents the center of the reflection band in frequency terms.

A preferred method of a multilayer mirror structure design in accordance with the present invention, comprises entering into a suitably-programmed computer a starting structure including a plurality or stack of quarter-wave layers of alternating high and low refractive index. The layers are at least sufficient in number to provide a desired reflection over a desired wavelength range within the bandwidth of stack of quarter-wave layers. The stack of quarter-wave layers is surmounted by two cavity-layers having a thickness of one half wavelength or greater and spaced apart by one or more other layers having a thickness less than one half-wavelength.

Optionally, the outermost cavity layer may be surmounted by one or more layers having a thickness less than one half-wavelength. Layers spacing the cavity layers and any layers surmounting the outermost cavity layer may be initially set at one quarter-wavelength for convenience of entry.

After the initial design is entered, the design is optimized to a desired GDD specification with only the innermost cavity layer and all other layers thereon allowed to vary in thickness, i.e., with all of the quarter-wave mirror layers fixed in thickness thereby maintaining at least the desired reflectivity through the range of variation in thickness of outer layers which is examined by the computer during the optimization process. Once the GDD specification has been met, any quarter-wave mirror layers in excess of those required to provide the desired reflectivity specification can be deleted.

Optimizing only to GDD targets in this manner not only greatly speeds the optimization process but avoids a conflict between reflection and GDD targets in deciding whether or not a combined reflection and GDD specification has been met. A complete design has been fully optimized in less than one hour.

In one example of a coherently or interferentially-coupled double (two-cavity) GTI in accordance with the present invention, having a total of forty layers, a substantially-constant GDD of about 42 $fs^2$ was computed over a bandwidth of about 140 nm. Of the forty layers the quarter-wave mirror portion accounted for thirty-three. Only the seven outer layers including the two cavity layers were optimized. Computed reflectivity, using optical constants (n and k) derived from actually deposited materials, was well in excess of 99.99% throughout the range of constant GDD. The optimized structure is clearly recognizable as a quarter-wave mirror structure surmounted by two spaced-apart GTI cavity layers.

BRIEF DESCRIPTION OF THE DRAWINGS

The accompanying drawings, which are incorporated in and constitute a part of the specification, schematically illustrate a preferred embodiment of the present invention, and together with the general description given above and the detailed description of the preferred embodiment given below, serve to explain the principles of the invention.

DETAILED DESCRIPTION OF THE INVENTION

Figure 1:
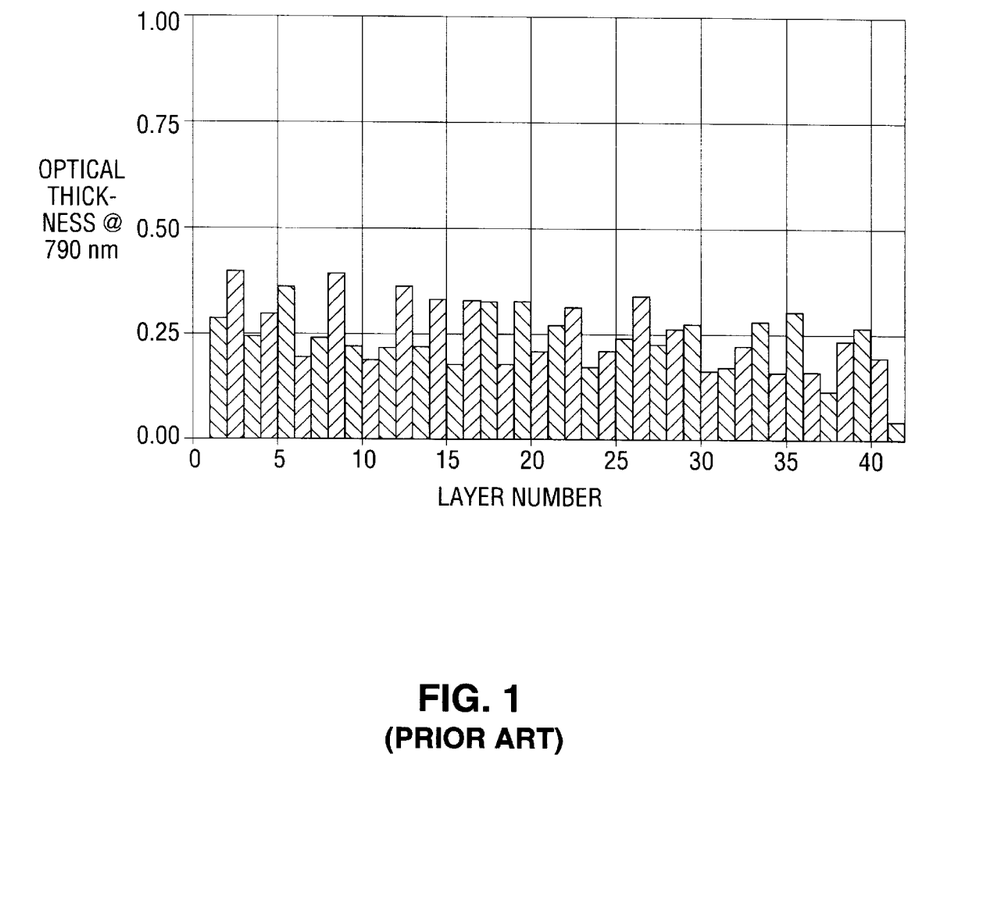
FIG. 1 is a bar graph schematically illustrating a prior-art, chirped-mirror layer structure providing a constant GDD of about −45 fs$^2$ over a bandwidth between about 730 nm and 830 nm.
Figure 2:
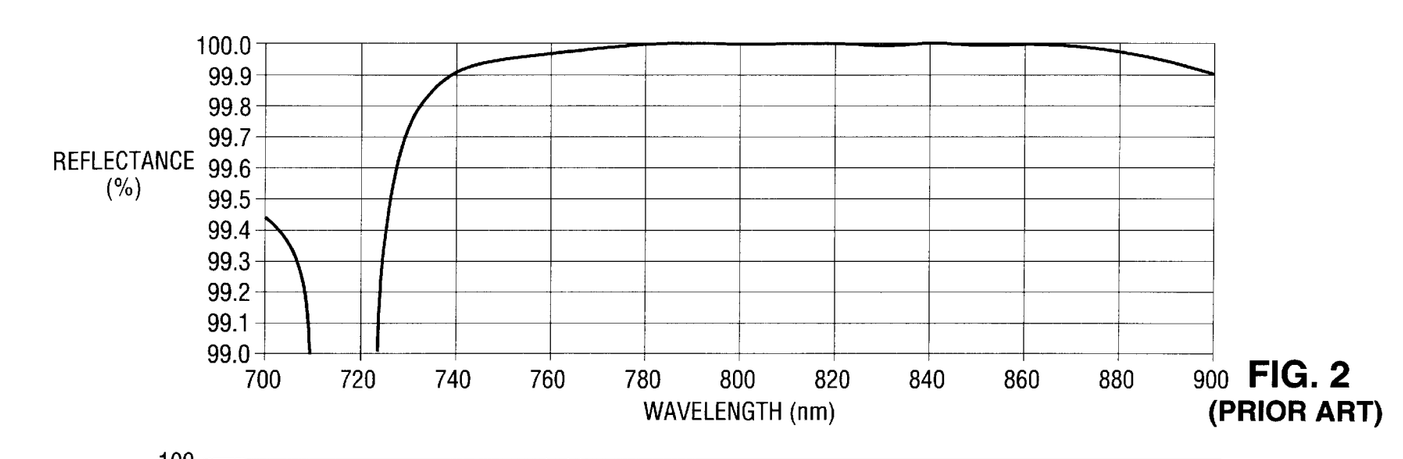
FIG. 2 is a graph schematically illustrating the computed reflection as a function of wavelength for the structure of FIG. 1.

Turning now to the drawings, wherein like features are indicated by like reference numerals, FIG. 1 illustrates, in bar graph form, a NGDD-mirror structure according to above discussed teachings of Szipocs et al. Each layer is shown as a vertical bar having a height proportional to its optical thickness. A value of 0.25 is a quarter-wave optical thickness or QWOT, at a wavelength, here, of 790 nm. These optical thicknesses are taken from Table 4 of the Szipocs et al. patent, that being an example of the disclosed "chirped-mirror". The layers are assumed to have non-dispersive high and low refractive indices of 2.31 and 1.45 respectively. There are 42 layers, the substrate being at the origin of the graph of FIG. 1, the first layer (on the substrate) being a low refractive index layer, layers alternating high and low refractive index thereafter. The computed reflection and GDD as a function of wavelength for the structure of FIG. 1 are depicted graphically in FIGS. 2 and 3 respectively.

Figure 4:
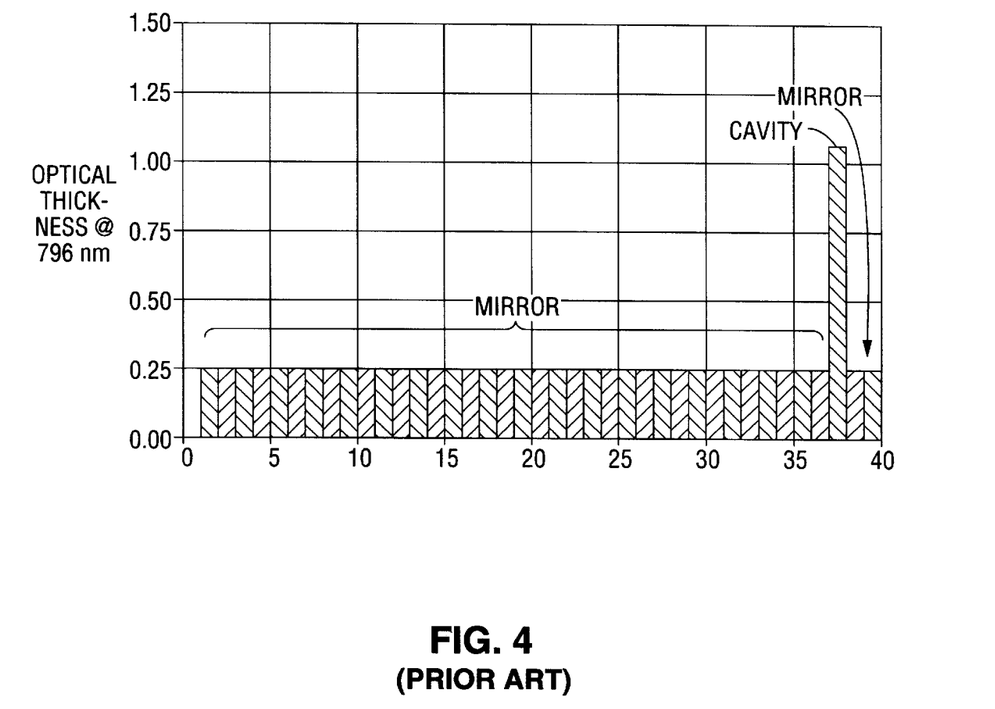
FIG. 4 is a bar graph schematically illustrating a prior-art, single cavity GTI structure layer structure providing a desired GDD of about −35 fs$^2$ over a bandwidth between about 775 nm and 825 nm.

Referring now to FIG. 4, the structure of a prior art GTI-mirror having a cavity optical thickness of about one wavelength is illustrated. All layers but the cavity layers are one-quarter wavelength optical thickness layers at a wavelength 796 nm. The cavity layer (layer 38) has an optical thickness of about 1.1 wavelengths at 796 nm. Odd-numbered layers are assumed to be layers of titanium dioxide ($TiO_2$). Even-numbered layers are assumed to be layers of silicon dioxide ($SiO_2$) having a refractive indices of about (2.24) and (1.44), respectively, in the wavelength region (about 700 nm to about 900 nm) of interest. It should be noted that in computations which follow, values of these indices are used which are interpolated from tabulated dispersion data at fixed wavelength points.

Figure 5:
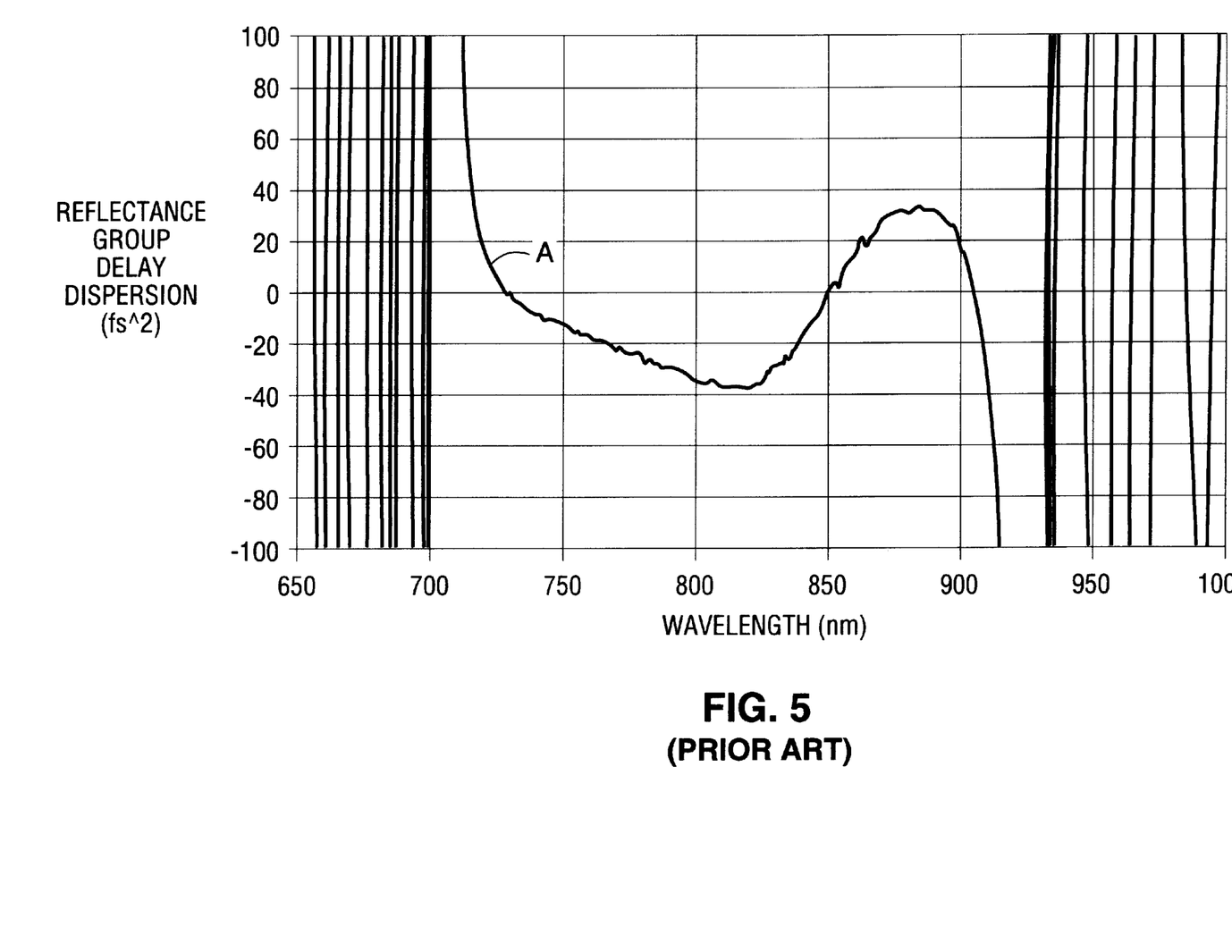
FIG. 5 is a graph schematically illustrating the computed reflection-GDD as a function of wavelength for the structure of FIG. 4.

The computed GDD as a function of wavelength (curve A) is depicted graphically in FIG. 5. From FIG. 5 it can be seen that there is a potentially useful range of negative GDD of about −35 fs$^2$ only between about 775 and 825 nm, i.e., about sufficient to support a single pulse-bandwidth. In prior-art tuneable lasers, practitioners have accommodated this narrow-bandwidth problem by "angle-tuning" the useful bandwidth. It should be noted here that the apparent high frequency noise in curve A, and in other such computed NGDD graphs herein, is due to rounding errors which are an artifact of interpolation of index values from the tabulated refractive index dispersion data.

Before proceeding with a detailed description of an interferentially-coupled multiple GTI in accordance with the present invention, it is useful to review how negative GDD is provided by a prior art GTI. Briefly and non-rigorously, the extent of wavelength-selective resonant trapping of the GTI is determined by the thickness of the cavity, which determines the distance per round trip in the cavity, and the wavelength dependent reflectivity at the cavity interfaces, which determines the amount of round trips. In a prior art GTI with one cavity, typically only the outer interface reflectivity is realistically variable, as reflectivity at the other interface is essentially that of the quarter-wave stack and is fixed for determining the overall reflectivity of the device. As with a resonant device such as a Fabry-Perot filter, an increase in spacer thickness (more correctly, increase in interference order) or an increase in reflectivity, increases wavelength selectivity and decreases bandwidth.

Figure 6A:
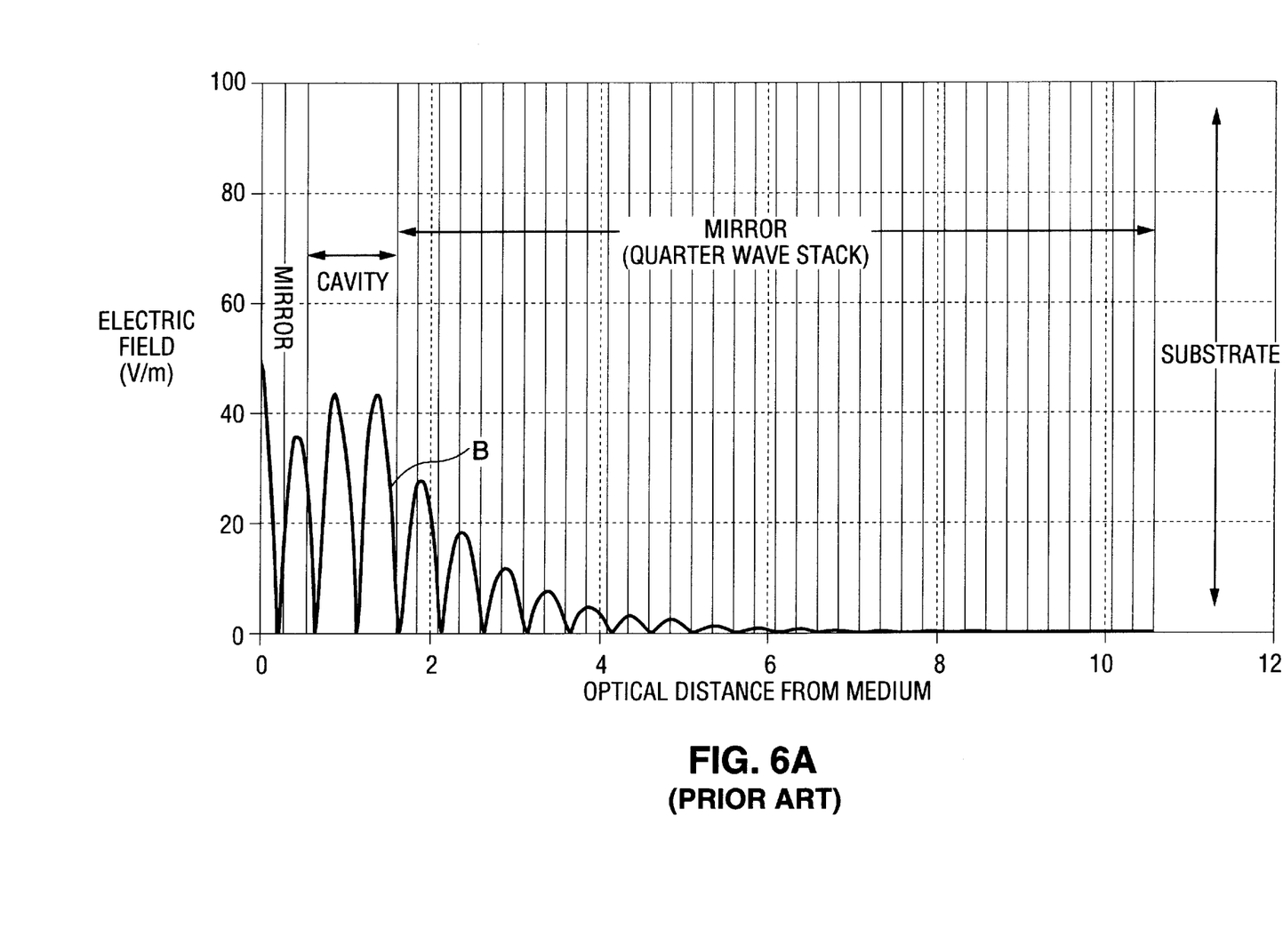
FIGS. 6A–B are graphs schematically illustrating electric field distribution for radiation at 775 and 825 nm wavelength respectively in the prior-art GTI structure of FIG. 4.
Figure 6B:
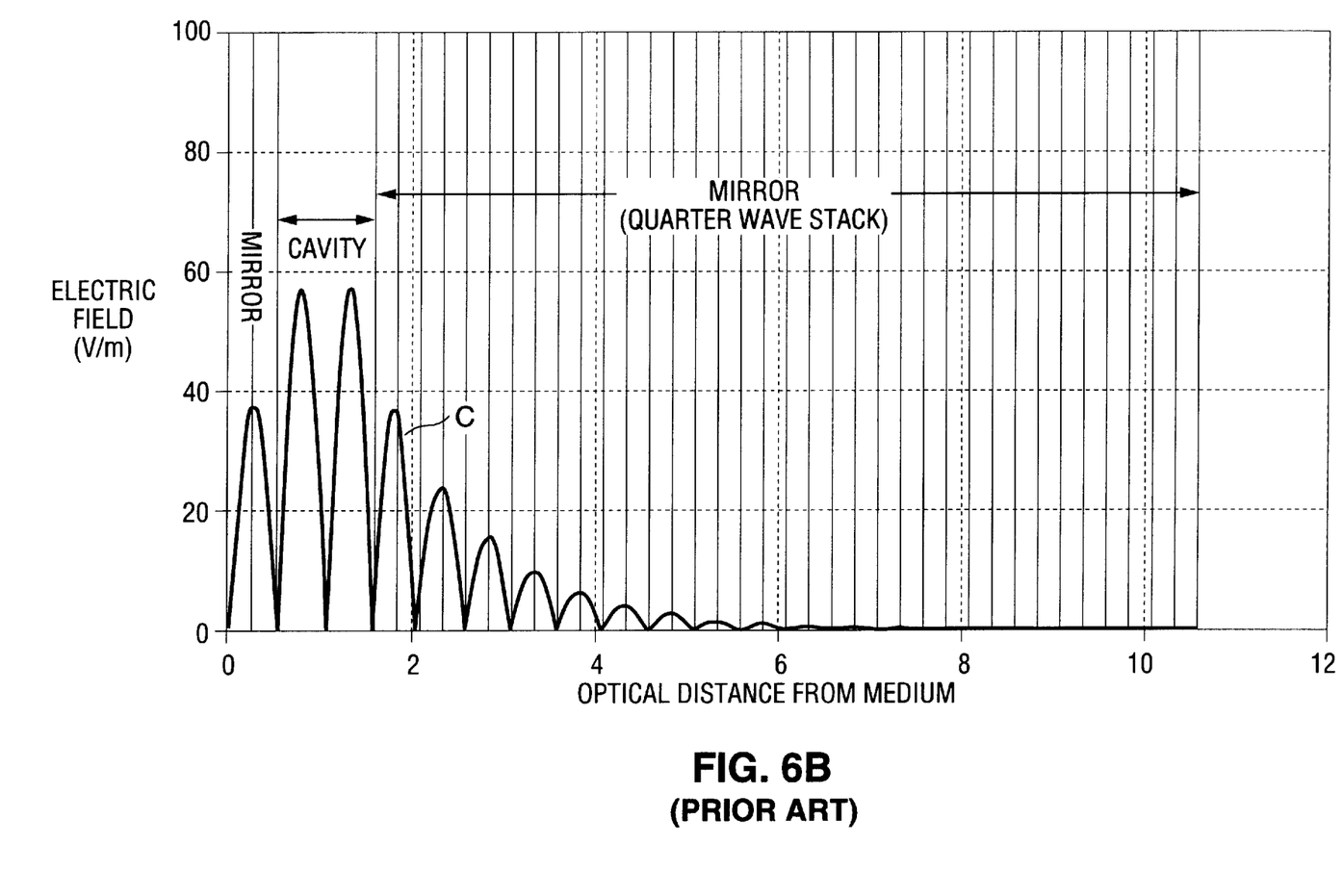

The resonant trapping action of a prior-art GTI can be appreciated by considering the computed distribution of electric field in the structure of FIG. 4 at two different wavelengths near short and long wavelength limits of the useful GDD bandwidth. This is shown for wavelengths of 775 and 825 nm in FIGS. 6A and 6B (curves B and C) respectively. In FIGS. 6A and 6B and similar graphs discussed herein, the x-axis is in optical thickness, or optical distance from the entrance medium (the front of the mirror). Solid vertical lines represent layer boundaries. Functional component layers and groups thereof are identified by name or reference numeral for clarity.

Curve B of FIG. 6A illustrates that in the cavity layer at 775 nm, the electric-field intensity is slightly amplified by the resonant trapping to a level higher than it has on entry into the cavity layer. Curve C of FIG. 6B illustrates much stronger amplification in the cavity layer at 825 nm. Increasing amplitude of the electric-field in the cavity layer with wavelength is the result of more round trips in the cavity, i.e., a greater delay, for the longer wavelengths than shorter wavelengths.

In the quarter-wave stack portion of the prior art GTI, the field simply decays as would be expected. The relative rate of decay is essentially equal for both exemplified wavelengths, the absolute intensity at any given point as a function of wavelength being determined, of course, by the magnitude of the field entering the quarter-wave stack from the cavity layer, which, as discussed above, is determined by the amplification due to resonant trapping.

Figure 7:
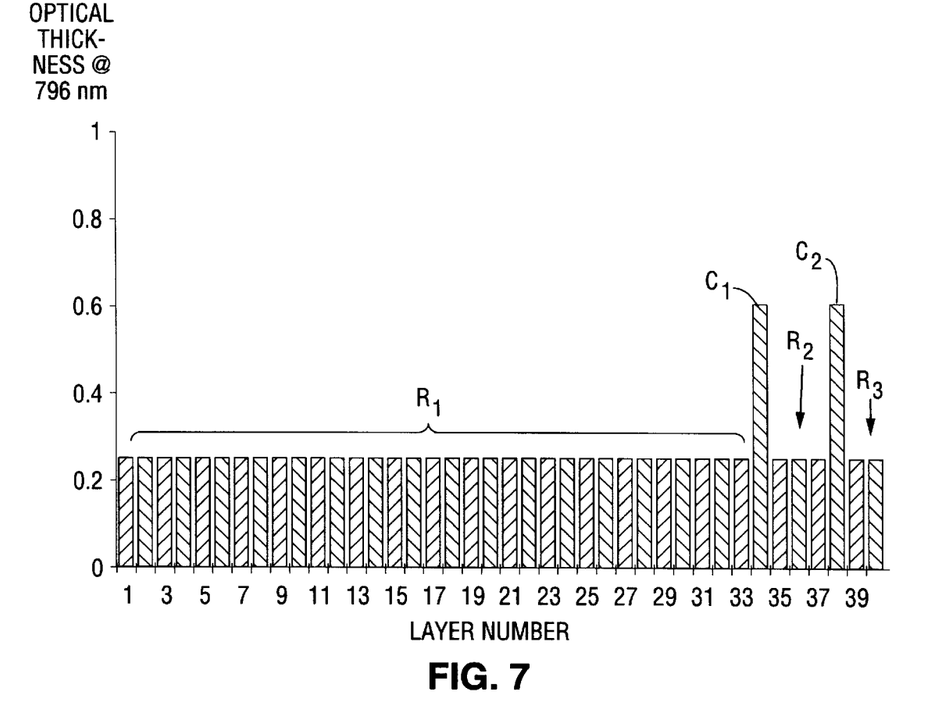
FIG. 7 is a bar graph schematically illustrating an initial structure, prior to optimization, for a forty-layer coherently-coupled double GTI structure in accordance with the present invention including a reflector stack surmounted by two spaced apart GTI cavities

In designing one embodiment of a interferentially-coupled multiple GTI in accordance with the present invention, an initial structure, depicted in bar graph form in FIG. 7, was optimized to GDD targets of $-42$ $fs^2$ in a range from 725 nm to 875 nm. In the structure of FIG. 7, layers are numbered from the substrate. Odd-numbered layers are high-refractive index layers, even numbered layers are low refractive index layers. The layers are assumed to be $TiO_2$ and $SiO_2$ as discussed above.

This initial structure may be designated as follows.

$$\text{Substrate}(H\ L)^{16}H2.2L(H\ L)^1H2.2LHL \tag{1}$$

where H and L represent one-quarter wavelength optical thickness or QWOT (here at 796 nm) of respectively high and low refractive index material (here $TiO_2$ and $SiO_2$). Layers within parentheses are designated a group, and the superscript outside the parentheses is designated a group-repetition number. A number preceding H or L indicates a multiple of H or L. This convention and minor variations thereof (linguistic or decimal, for example) are well known to those skilled in the art.

The structure of equation (1) can be expressed simply as:

$$R_1(C_1)R_2(C_2)R_3 \tag{2}$$

where $R_1$ is a first-mirror (quarter-wave stack) formed from layers 1–33 and having a reflection bandwidth characteristic of the refractive index values of H and L; $C_1$ is a GTI resonant cavity somewhat greater in thickness than one half-wavelength (2.2L) at the center wavelength of $R_1$; $R_2$ is a second mirror $(H\ L)^1$ H formed from layers 34–37, $C_2$ is another GTI resonant cavity, somewhat greater in thickness than one half-wavelength (2.2L) at the center wavelength of $R_1$; and $R_3$ is a third mirror (H L) formed from layers 39 and 40. Those skilled in the art will recognize that mirrors $R_1$, $R_2$ and $R_3$ are wavelength-selective reflectors. Reflectivity of $R_1$ is very much greater than that of $R_2$ or $R_3$ and provides the required reflectivity for the NGDD mirror as in a prior-art GTI. The reflectivity of $R_2$ is usually greater than that of $R_3$. R2 and R3 may be referred to as partially reflective (partially transmissive) reflectors.

In another, simpler description of the initial structure, $(C_1)R_2$ is a first GTI and $(C_2)R_3$ is a second GTI in parallel alignment with and therefore interferentially or coherently-coupled with the first GTI. These GTIs are monolithically assembled on a common high reflectivity mirror $R_1$.

In optimizing the structure of FIG. 7, layers 1–33 were fixed (prevented from being varied by the optimization). Because of this, it was not necessary to optimize to any other than the GDD targets. This greatly speeded the optimization process. The optimized structure of the inventive interferentially-coupled double GTI is depicted in bar graph form in FIG. 8.

Figure 8:
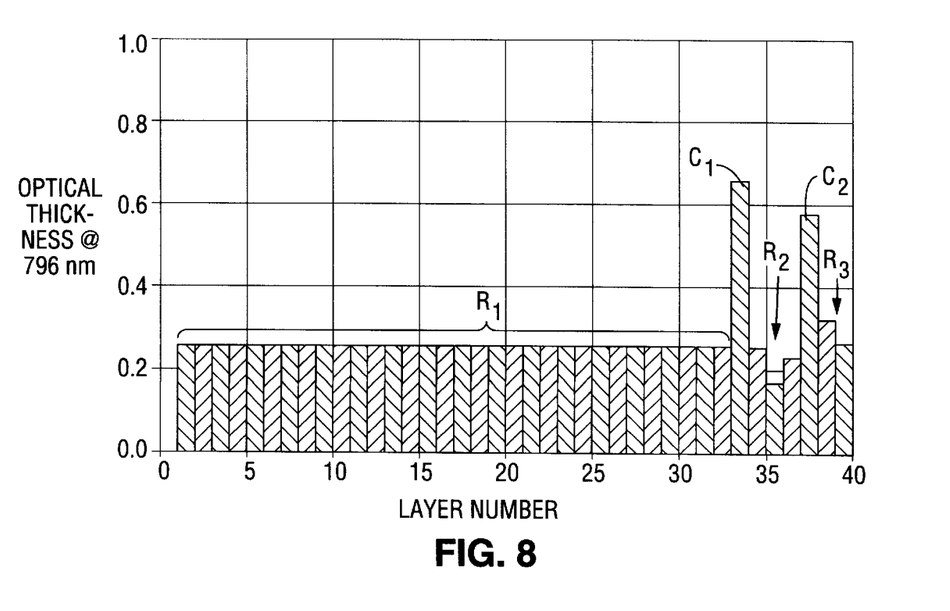
FIG. 8 is a bar graph schematically illustrating one example of a forty-layer coherently-coupled double GTI structure in accordance with the present invention optimized from the structure of FIG. 7, providing a substantially constant NGDD of about −42 fs$^2$ over a bandwidth at least between about 750 nm and 890 nm, and still recognizable as including a reflector stack surmounted by two spaced apart GTI cavities

It can be seen from FIG. 8 that the basic form (mirror/cavity/mirror/cavity/mirror) of the initial structure of FIG. 7 has been retained. Mirrors and cavities are clearly recognizable. The optimization of the outer seven layers has resulted in an adjustment of the wavelength selective mirrors $R_2$ and $R_3$ and the thickness of the cavities. The mirror adjustment also adjusts the interferential coupling of the cavities. Layers of $R_2$ and $R_3$ have an optical thickness less than one-half wavelength at a wavelength within the reflection bandwidth of $R_1$.

Figure 9:
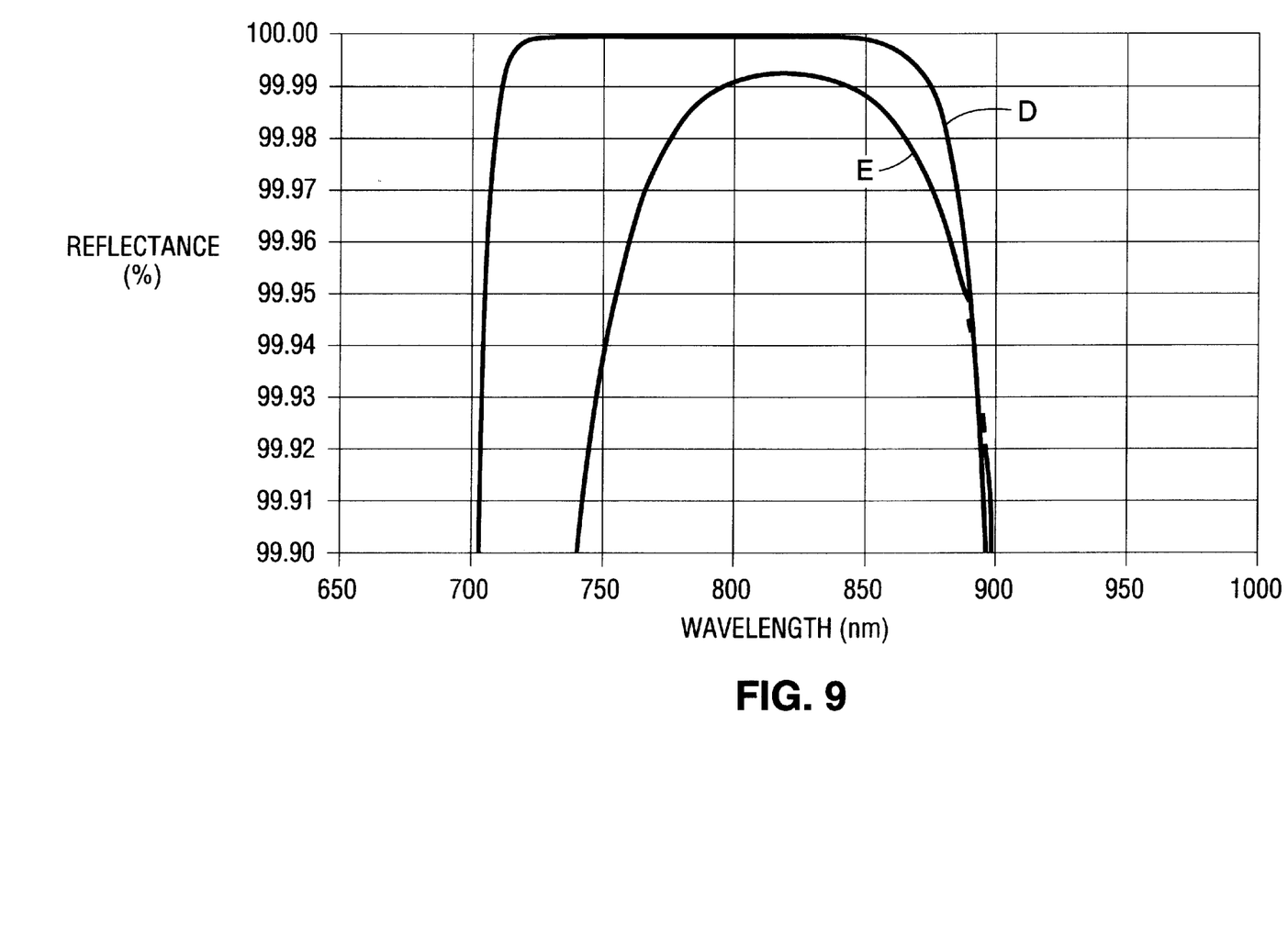
FIG. 9 is a graph schematically illustrating the computed reflection as a function of wavelength for the NGDD-mirror structure of FIG. 8.
Figure 10:
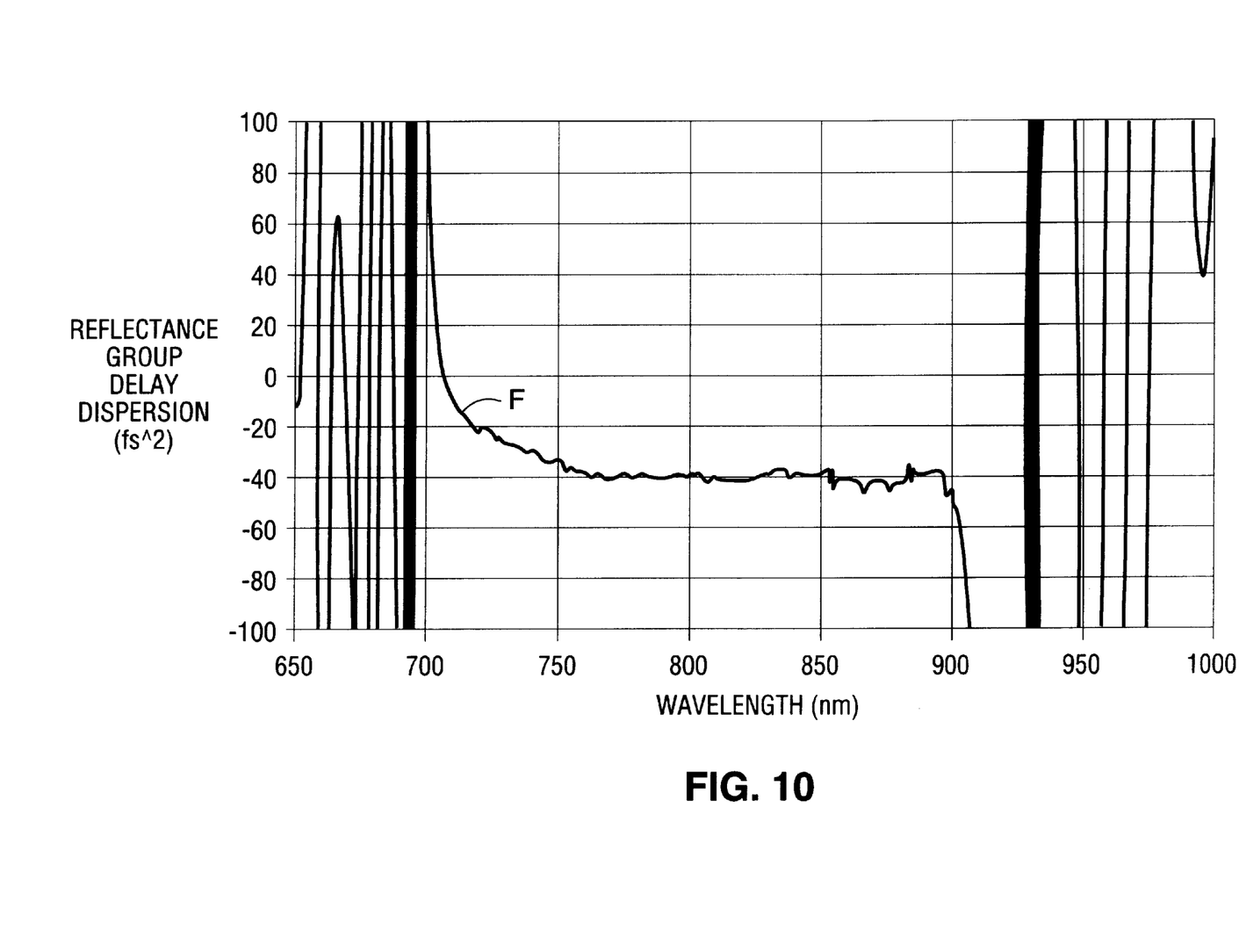
FIG. 10 is a graph schematically illustrating the computed reflection-GDD as a function of wavelength for the double GTI structure of FIG. 8.

The computed reflection and GDD of the structure of FIG. 8 are depicted graphically in FIGS. 9 and 10 respectively. From FIG. 10 (curve F) it can be seen that GDD is substantially constant in a region between 750 and 890 nm. The terminology "substantially constant" in this description and the appended claims recognizes that there may be tolerable fluctuations about a nominal value of about ±15% thereof. Clearly, curve F is well within such tolerances. The apparent high-frequency "noise" in the curve is as explained above. The nearly vertical lines on either wavelength side of curve F are abrupt, relatively very-large GDD variations resulting from abrupt $2\pi$ phase changes at the boundaries of, and in the sidebands of, the normal or characteristic reflection band of $R_1$.

In FIG. 9, curve D depicts computed reflectivity in excess of 99.95 throughout the constant-NGDD region, greater than 99.99 through most of that region and greater than 99.999% at peak. By way of comparison, curve E shows the computed reflectivity of the prior-art Szipocs et al. structure of FIG. 1. It should be noted that this Szipocs et al. structure has more layers than the structure of FIG. 8, and further that a 33-layer quarter-wave stack of materials having the refractive indices assumed by Szipocs et al. would have a higher reflectivity and a higher bandwidth than those of the inventive structure. This clearly indicates a significant disadvantage of extensive "chirping".

Figure 3:
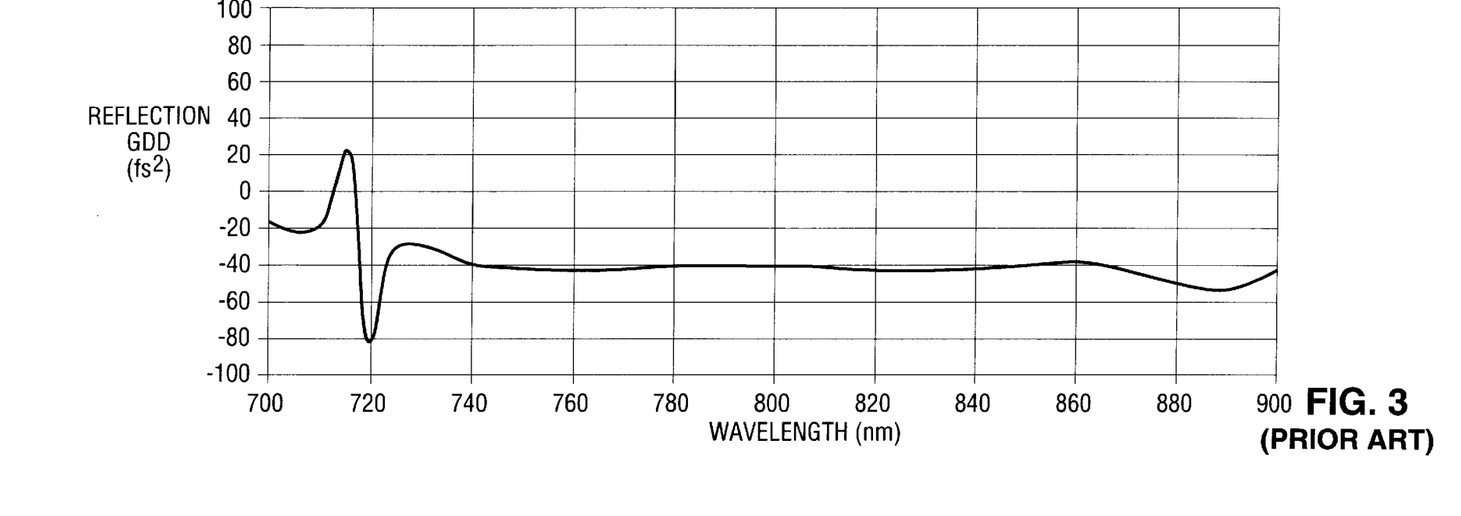
FIG. 3 is a graph schematically illustrating the computed reflection-GDD as a function of wavelength for the structure of FIG. 1.

Comparing the graphs of FIG. 3 with FIG. 10, it can be seen that the GDD is constant over about the same bandwidth as the GDD of the prior-art Szipocs et al. "chirped mirror". Note that the prior-art structure shows an extreme perturbation of the GDD in the region of 720 nm. This is believed also to be another disadvantageous result of the aperiodicity or "chirping" of the mirror structure. There is no such perturbation, however, in the GDD curve of the inventive structure, as the basic mirror structure ($R_1$) is simply not "chirped".

The manner in which the GDD result of FIG. 10 is achieved by GTI-like or Fabry-Perot-like resonant trapping in the inventive NGDD-mirror structure is next discussed with reference to FIGS. 11A and 11B. Here, the distribution of electric field intensity for radiation at respectively 765 and 875 nm wavelength (curves G and H respectively) in the structure of FIG. 8 is graphically depicted.

Figure 11A:
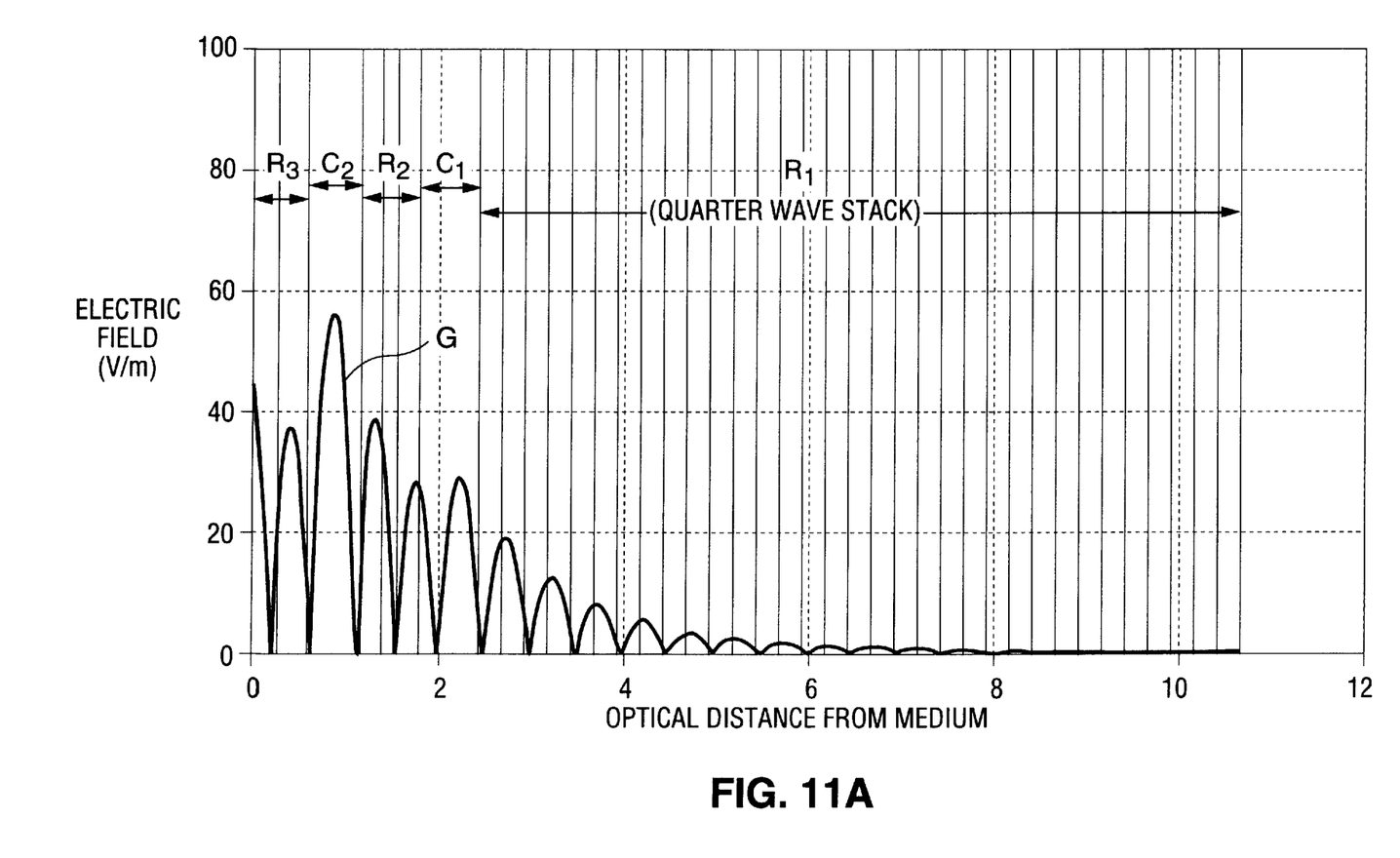
FIGS. 11A–B are graphs schematically illustrating electric field distribution for radiation at 765 and 875 nm wavelength respectively in the coherently-coupled double GTI structure of FIG. 8.
Figure 11B:
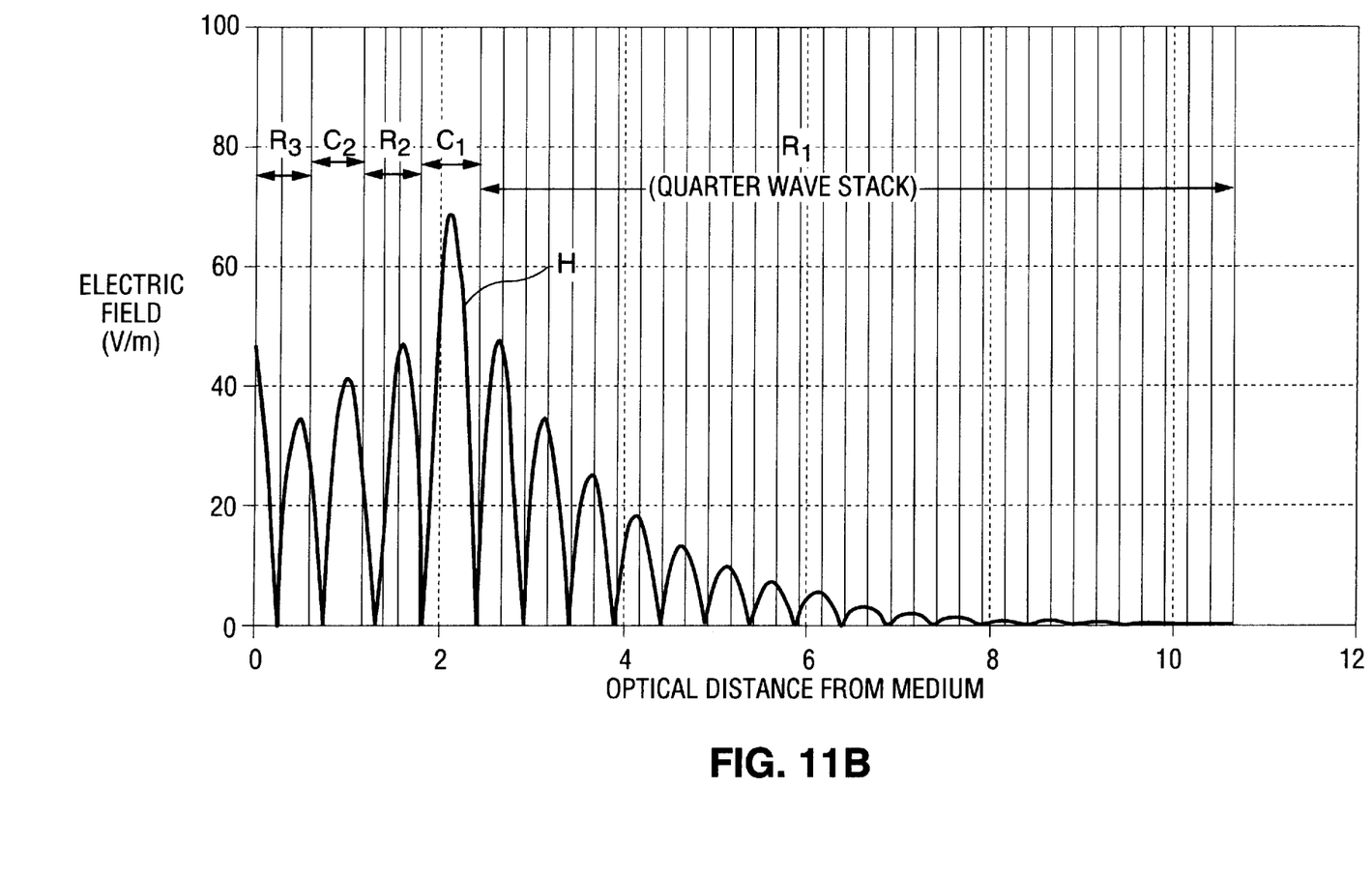

In considering the plots of FIGS. 11A and B, it should be noted that if a peak in the electric field is higher than a preceding peak, this is the result of resonant trapping (multiple reflections) in the two cavities of the structure. So it can be seen from FIG. 11A that even for wavelengths near the short-wavelength end of the constant GDD bandwidth there is significant resonant trapping in the front ($C_2$) cavity and weaker resonant trapping in the rear ($C_1$) cavity. Curve H of FIG. 11B indicates that at wavelengths near the long-wavelength end of the constant GDD bandwidth, resonant trapping is strongest in rear cavity ($C_1$). Those choosing to undertake further analysis would find that, for wavelengths near the center of the constant GDD bandwidth, resonant trapping has an almost equal level in both cavities.

As such, it may be concluded that the NGDD-providing mechanism of a the inventive structure primarily one of differential resonant trapping of wavelengths within the wavelength range of desired NGDD. At none of the wavelengths is there any indication of resonant trapping in mirror $R_1$. This is to be expected from a quarter-wave stack having a reflection bandwidth which includes the wavelengths of the plots of FIGS. 11A and 11B.

Figure 12:
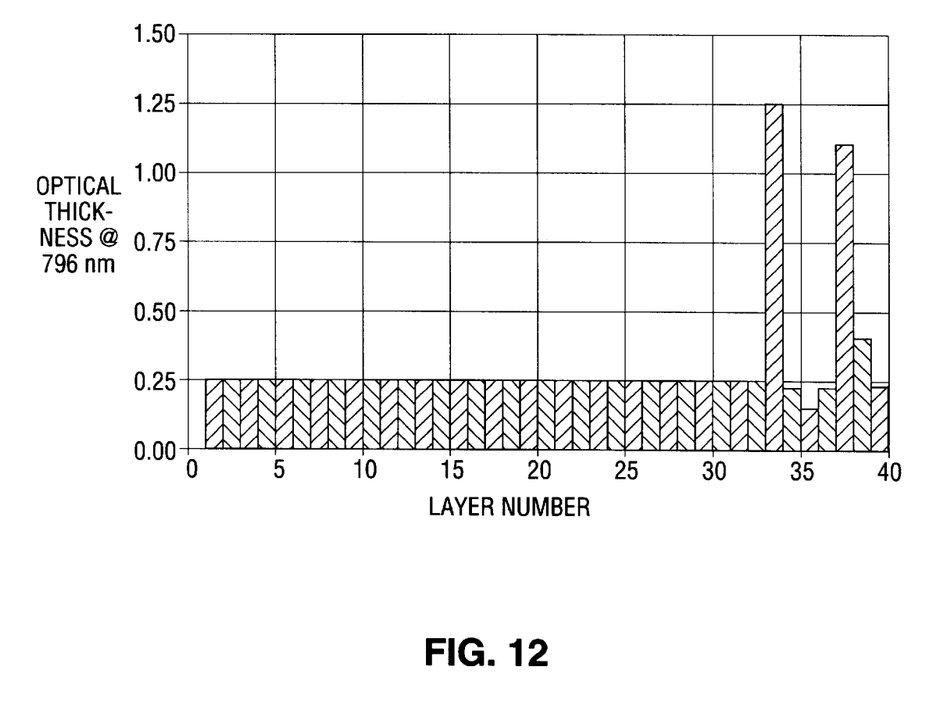
FIG. 12 is a bar graph schematically illustrating a second example of a coherently-coupled double GTI layer structure in accordance with the present invention, providing a substantially constant NGDD of about −65 fs$^2$ and greater than 99.99% reflectivity over a bandwidth at least between about 770 nm and 860 nm.
Figure 13:
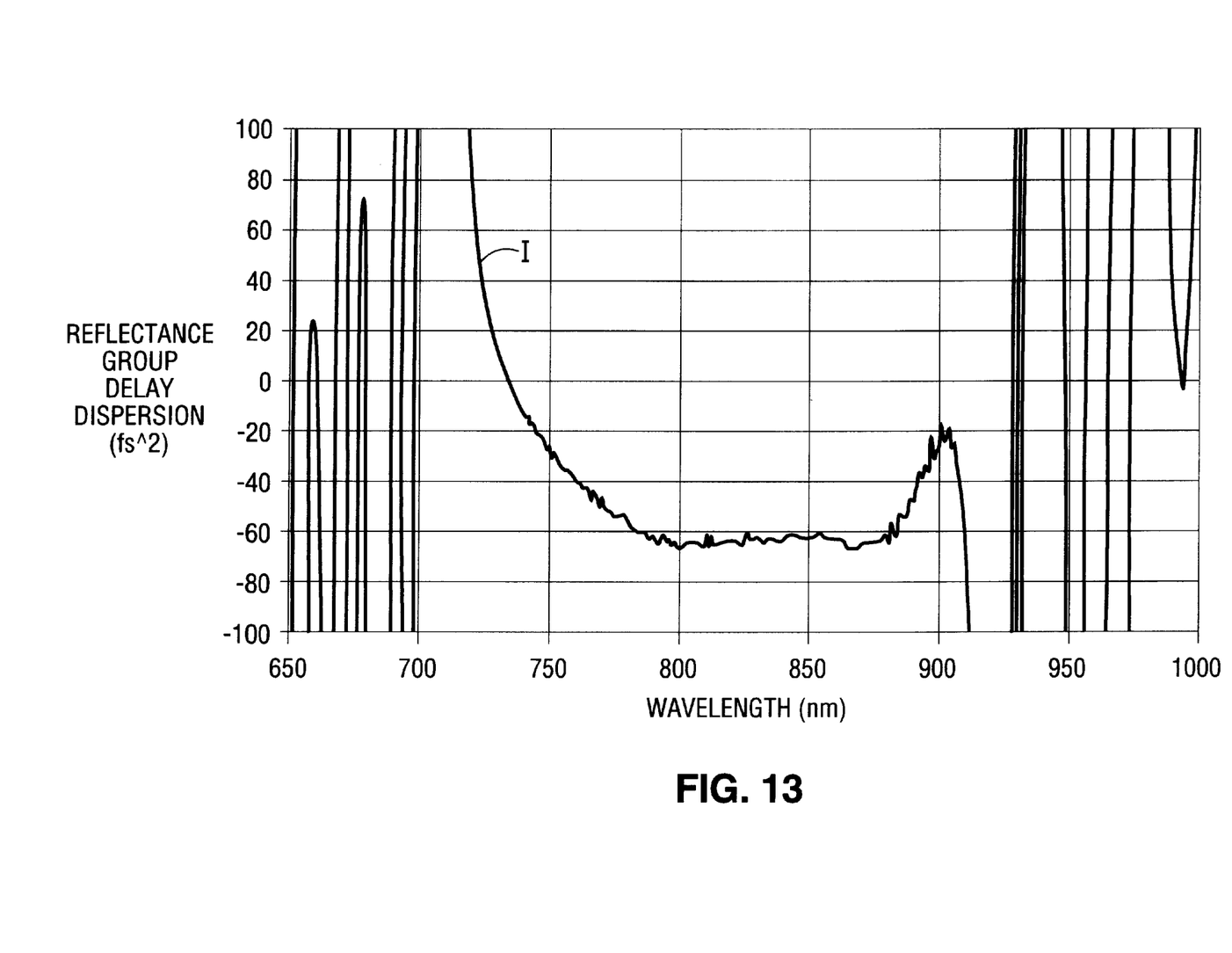
FIG. 13 is a graph schematically illustrating the computed reflection-GDD as a function of wavelength for the NGDD-mirror structure of FIG. 12.

Now recognizing that the GDD property of the inventive NGDD mirror is controlled by the coherently-coupled double GTI arrangement $(C_1)R_2(C_2)R_3$, it can be expected that increasing the thickness of one or both cavities in the foregoing example would increase the negative GDD. An analogy with increasing order of a Fabry-Perot etalon spacer would indicate that this would be achieved at the expense of a narrower GDD bandwidth. Such a structure is illustrated in bar graph form in FIG. 12. Here cavities $C_1$ and $C_2$ (layers 34 and 38) have each been increased in optical thickness by an order of interference (one half-wavelength) compared with corresponding cavities in the structure of FIG. 8. It can be seen that the basic form of the structure of FIG. 12 is exactly the same as that of the structure of FIG. 8. The GDD as a function of wavelength is illustrated graphically in FIG. 13 (curve I). It can be seen that there is a substantially constant GDD region of between about −60 and −65 fs^2 between about 780 and 880 nm. The reflectivity as a function of wavelength is, essentially, exactly that depicted in FIG. 9 (curve D) for the structure of FIG. 8.

It is emphasized here, that while examples of coherently or interferentially-coupled multiple GTI devices in accordance with the present invention are designed to have a substantially constant NGDD over a selected wavelength range, this should not be considered as limiting the inventive structures. The structure may also be optimized to provide a negative GDD which alternatively increase or decrease in a generally linear fashion across the wavelength range. The terminology generally linear, here, recognizing that there may be fluctuations up to about ±15% present due to fourth and higher order dispersion effects. Such a generally linear increase or decrease feature may be advantageous in controlling third order dispersion effects in a device in which the structures are incorporated.

Comparing the many layers for which optimization appears to be necessary in the prior art "chirped-mirror" approach to the design of reflective NGDD devices, it may seem, on the face of it that coherently-coupled multiple GTI structure of the present invention, with comparatively very few layers optimized, could have limitations in range of GDD performance that could be achieved. However, even in the simple inventive structure, there are many combinations of variables available in the GTI portion of the structure as pointed in the following examples. The refractive index of all layers is variable. The cavity layers may be of a high refractive index or low refractive index, relative to immediately adjacent layers. The interference order of the cavity layers can be varied, as exemplified above, and cavities need not be of the same interference order. The number of layers between cavity layers can be varied from one to a plurality of layers. The number of outer-mirror layers may be varied and may be zero. The foregoing variable examples should not be considered exhaustive. Flexibility can be further increased by adding a third interferentially-coupled GTI cavity spaced from an adjacent cavity by one or more other layers. Cavities are preferably spaced by odd numbers of layers (1, 3, or greater) of different refractive index. It should be noted that even if outer-mirror layers are omitted an outer mirror is still formed by the Fresnel reflection from the cavity/air interface.

The inventive, coherently-coupled multiple GTI has been described above in terms of structures optimized for use with radiation incident thereon at normal incidence. In certain instances, however, there could be some advantage to designing structures for use at a relatively high incidence angle, for example, about 45°, and for light polarized perpendicular to the plane of incidence (s-polarized). This has been done with prior-art NGDD devices, such as the Gires-Tournois interferometer, to extend the bandwidth of the device.

An advantage of designing for s-polarized light is that for a given pair of materials (a high and a low refractive index material), the effective index-ratio for the s-polarized light increases with increasing angle of incidence. This means that the above-discussed "normal" reflection bandwidth for these materials increases. Those familiar with the art will recognize that the individual effective-indices actually decrease. This can be of advantage in general in designing structures in accordance with the present invention, inasmuch as the angle of incidence can provide effective-index ratios not available with "real" material combinations. The basic structure of such devices would remain the same. Layers of the quarter-wave stack ($R_1$), for example would be adjusted to be effectively quarter-waves for s-polarization at the intended angle of use. The principle of "effective thickness" is well-known in the prior art.

Throughout the above-presented description, examples of NGDD mirror structures in accordance with the present invention have been presented with reference to wavelength-dependent functions for parameters such as reflectivity, NGDD and reflective phase-shift, as such are common in the art to which the present invention generally pertains. Those skilled in the art will recognize that the principles of the present invention are equally applicable if a wavelength related parameter such as frequency, energy, wavenumber or relative-wavenumber is selected for specifying those parameters.

An advantageous aspect of the inventive coherently-coupled multiple-GTI structure is that one quarter-wave stack mirror-design can be used as a base for a range of such coherently-coupled multiple-GTI structures. Note for example that the mirror portions of the structures of FIGS. 8 and 12 are identical. This would allow mirrors to be made and refined separately to ensure that layer thickness deviation from ideal is within a range where there is no significant effect on GDD. Various GTI structures could then be added in a separate deposition. This would be of great advantage inasmuch as by using such "refined" mirrors, the cause of any deviation from a desired specification of a completed NGDD-mirror structure would be traceable to the added multiple GTI structure. As this has relatively few layers, the source of the error could be rapidly isolated, with little possibility of ambiguity, by reverse-engineering computations. This and other advantages of the inventive structure will be evident to those skilled in the optical thin film art.

The present invention has been described and depicted as a preferred and other embodiments. The invention is not limited, however, to those embodiments described and depicted. Rather, the invention is defined by the claims appended hereto.

What is claimed is:

1. A negative group-delay-dispersion mirror, comprising:
   a highly reflective quarter-wave multilayer reflector;
   two spaced-apart interferentially coupled Gires-Tournois interferometer cavities surmounting said highly reflective quarter-wave multilayer reflector and forming a single monolithic multilayer structure;

said quarter-wave multilayer reflector having a characteristic reflection bandwidth; and the negative group-delay-dispersion mirror having a reflectivity greater than 99 percent and a selected negative group delay dispersion as a function of wavelength over a selected range of wavelengths of about 60 nanometers or greater within said characteristic reflection bandwidth, said selected negative group delay dispersion being one of increasing generally linearly, decreasing generally linearly, and substantially constant over said selected range of wavelengths.

2. The mirror of claim 1, wherein said selected negative group delay dispersion is substantially-constant over said selected wavelength range.

3. The mirror of claim 1, wherein said selected negative group delay dispersion alternatively decreases or increases generally linearly over said selected wavelength range.

4. A multilayer reflective device, comprising:

a quarter-wavelength multilayer reflector having a center wavelength and a reflection bandwidth, said quarter-wavelength multilayer reflector being surmounted by an interferometer multilayer structure including first and second resonant-cavity layers each having an optical thickness of one-half wavelength or greater at the center wavelength of said quarter-wavelength multilayer reflector;

said resonant-cavity layers being spaced apart by one or more layers forming a wavelength-selective partial reflector between said cavity layers, each of said one or more layers having an optical thickness less than one half-wavelength at a wavelength within the reflection bandwidth of said quarter-wavelength multilayer reflector; and layers of said interferometer multilayer structure having a thickness arranged together with the number of layers of said quarter wave-multilayer reflector such that the multilayer reflective device has a selected negative group delay dispersion as a function of wavelength and a reflectivity greater than 99 percent over a selected wavelength range of about 60 nanometers or greater lying within the reflection bandwidth of the quarter-wavelength multilayer reflector, said selected negative group delay dispersion being one of increasing generally linearly, decreasing generally linearly, and substantially constant over said selected range of wavelengths.

5. The multilayer reflective device of claim 4, wherein said first resonant cavity layer of said interferometer multilayer structure is immediately adjacent said quarter-wavelength multilayer reflector.

6. The multilayer reflective device of claim 5, further including one or more layers surmounting said second resonant-cavity layer.

7. The multilayer reflective device of claim 4, wherein said selected negative group delay dispersion is substantially-constant over said selected wavelength range.

8. The multilayer reflective device of claim 4, wherein said selected negative group delay dispersion alternatively decreases or increases generally linearly over said selected wavelength range.

9. A multilayer reflective device, comprising:

a first plurality of transparent dielectric layers alternating high and low refractive index and each having a quarter-wavelength optical thickness at a center wavelength, said plurality of layers forming a first wavelength-selective reflector having a characteristic reflection bandwidth;

a second plurality of transparent dielectric layers deposited on said first plurality of dielectric layers and arranged to form an interferometer multilayer structure;

said interferometer multilayer structure including first and second resonant-cavity layers spaced apart by three other layers, said first and second resonant-cavity layers of said interferometer multilayer structure each having an optical thickness of one-half wavelength or greater at the center wavelength, and said first resonant-cavity layer being adjacent said first plurality of layers;

said three other layers of said interferometer multilayer structure forming a second wavelength-selective reflector between said resonant-cavity layers of said interferometer multilayer structure, each of said three other layers of said interferometer multilayer structure having an optical thickness less than one half-wavelength at a wavelength within the reflection bandwidth of said first wavelength-selective reflector; and layers of said interferometer layer structure having a thickness arranged cooperative with number of layers in said first plurality of layers such that the multilayer reflective device has a selected negative group delay dispersion as a function wavelength and a reflectivity greater than 99 percent over a selected wavelength range of about 60 nanometers or greater lying within the bandwidth of said first wavelength-selective reflector, said selected negative group delay dispersion being one of increasing generally linearly, decreasing generally linearly, and substantially constant over said selected range of wavelengths.

10. The multilayer reflective device of claim 9, wherein said selected negative group delay dispersion is substantially-constant over said selected wavelength range.

11. The multilayer reflective device of claim 9, wherein said selected negative group delay dispersion alternatively decreases or increases generally linearly over said selected wavelength range.

12. The multilayer reflective device of claim 9 wherein said second resonant-cavity layer is the outermost layer of said multilayer reflective device.

13. The multilayer reflective device of claim 9 wherein said second resonant-cavity layer has one or more layers thereon forming a third wavelength-selective reflector.

* * * * *